US008181977B1

(12) United States Patent
Bartlett

(10) Patent No.: US 8,181,977 B1
(45) Date of Patent: May 22, 2012

(54) BICYCLE ARM-DRIVE APPARATUS

(76) Inventor: Christopher B. Bartlett, Boulder, CO (US)

( * ) Notice: Subject to any disclaimer, the term of this patent is extended or adjusted under 35 U.S.C. 154(b) by 451 days.

(21) Appl. No.: 12/384,692

(22) Filed: Apr. 8, 2009

(51) Int. Cl.
  *B62M 1/12* (2006.01)
(52) U.S. Cl. ............... 280/233; 280/234; 280/242.1; 280/244; 280/247
(58) Field of Classification Search .......... 280/230, 280/233, 234, 242.1, 244, 247, 288.4
  See application file for complete search history.

(56) References Cited

U.S. PATENT DOCUMENTS

| 551,667 | A | * | 12/1895 | Dunn | 280/234 |
|---|---|---|---|---|---|
| 1,141,364 | A | | 6/1915 | Spanovic | |
| 5,511,810 | A | * | 4/1996 | Tong | 280/233 |
| 5,775,708 | A | | 7/1998 | Heath | |
| 6,032,970 | A | | 3/2000 | Porter | |
| 6,099,009 | A | * | 8/2000 | Schroeder | 280/234 |
| 6,352,274 | B1 | * | 3/2002 | Redman | 280/248 |
| 6,725,978 | B2 | * | 4/2004 | Karpowich | 188/20 |
| 7,000,934 | B1 | | 2/2006 | Capek | |
| 2010/0164195 | A1 | * | 7/2010 | Chuang | 280/152.1 |

* cited by examiner

*Primary Examiner* — Tony H. Winner
*Assistant Examiner* — Jacob Knutson
(74) *Attorney, Agent, or Firm* — John R. Flanagan

(57) ABSTRACT

A bicycle arm-drive apparatus includes a stationary mounting structure, an arm drive input mechanism, a drive motion transmission mechanism, and a plurality of connectors. One end of the mounting structure attaches to the front-center portion of the bicycle. The arm drive input mechanism includes a pair of control arms that pivotally attach to the other end of the mounting structure and generally extend rearward and outward from there. The operator grips each control arm, inputting arm power by driving them fore-and-aft. The drive motion transmission mechanism includes a pair of connecting rod assemblies running down opposite sides of the bicycle frame between the control arms and bicycle pedals. A plurality of connectors link the connecting rod assemblies to the pedals and control arms in order to transmit control arm fore-and-aft movement via the connecting rod assemblies to the pedals to enable the arm power to assist with bicycle pedaling.

8 Claims, 14 Drawing Sheets

Motion of Set Screw Rotates Wedges

Wedges Clamp Lower Connecting Rod to Tube

BICYCLE ARM-DRIVE APPARATUS

BACKGROUND OF THE INVENTION

1. Field of the Invention

The present invention generally relates to arm-power assisted bicycle operation and, more particularly, to an arm-drive apparatus mountable to a bicycle for providing upper body exercise through assisting leg power driving the bicycle.

2. Description of the Prior Art

A conventional bicycle is typically designed to be operated by movement of the legs of a rider/operator rotating a pedal crankshaft that drives the rear wheel of the bicycle. Arms and hands of the operator are typically relegated to steering the front wheel of the bicycle via a set of bicycle handlebars. In order to accomplish a more complete bicycle exercise routine, some designs have sought to augment the conventional leg operated bicycle design with a mechanism for using the arms as well. However, most arm-drive designs have achieved mixed results with respect to adaptability and effectiveness when attached to conventional bicycles.

One recent approach to arm-power assisted operation is disclosed in U.S. Pat. No. 5,511,810 to Tong. It teaches a removable arm-drive apparatus that is powered by long pivoting levers that attach to the front frame of the bicycle via a T-shaped bracket. Operating above and in front of the handlebars, the pivoting forward and rearward motion of the long levers then transfers the arm movement to the pedals by way of long connecting rods. The design disclosed in U.S. Pat. No. 7,000,934 to Capek similarly uses long levers pivoting about a bracket fulcrum that transfer arm motion to the pedals using connecting rods, but the bracket is instead attached to the bicycle frame near the center of the upper frame tube. Additionally, Capek removes the bicycle handlebars from the steering tube and replaces them with a steering disk and steering links that allow the cyclist to steer by rotating the upper ends of the long arm levers. In U.S. Pat. No. 6,032,970, Porter pivots long lever arms similar to the prior art patents discussed above but the fulcrum in this design lies near the bottom center of the steerable front end fork. Consequently, when the oscillating lever arms are turned the bicycle steers as well. Alternately, the apparatus connecting rods may be removed and the lever arms rigidly fixed to the fork so that the tops of the lever arms become handlebars and the bicycle is steered in a normal fashion. Another approach attempted to work around the inherent difficulty of merging steering capability into an arm-drive apparatus by adding a cable steering mechanism. In U.S. Pat. No. 5,775,708 to Heath, the exercise vehicle disclosed uses an arm-drive mechanism attached rigidly to the frame that uses lever arms connected to pedal planks for propulsion, but uses a hand-operated cable assembly attached near the top of the lever arms to provide steerability.

Despite these prior art designs, several problems still remain in the field of arm-drive bicycle operation. First, the previous devices often comprise a large or unwieldy lever system that interferes with normal bicycle pedaling and steering operation. It would be more desirable to couple a smaller more ergonomic design with a device that can be easily retrofitted onto an existing bicycle. Moreover, these prior art designs do not appear to be easily attachable to a bicycle while leaving the existing steering system intact and also while providing an efficient and stable arm-driven mechanism for the rider.

Thus, a need still exists for an arm-drive apparatus that overcomes the drawbacks of these prior art patents.

SUMMARY OF THE INVENTION

The present invention provides a bicycle arm-drive apparatus designed to overcome the above-described drawbacks and satisfy the aforementioned need. The arm drive apparatus disclosed herein is particularly suited for being mounted to a bicycle so that a rider can simultaneously use leg and arm power to drive it. The apparatus provides an effective arm-drive mechanism that minimally interferes with bicycle operation, and more specifically, with steering operation. The arm-drive mechanism is also designed to be effective while avoiding instability that can occur by arm forces applied near the steering mechanism. The apparatus of the present invention is also particularly designed to be easily removable from the bicycle. While the most widespread example of a vehicle using such arm-drive mechanism is a bicycle, the principles of the arm-drive apparatus of the present invention can be applied to other types of vehicles as well, such as tricycles or stationary exercise equipment. Therefore, it will be understood and assumed that while only the term "bicycle" is used hereinafter for the sake of brevity, this term will be taken in the broad sense as meaning all vehicles adapted to use such an arm-drive apparatus.

The present invention relates to an arm-drive apparatus which basically includes a stationary mounting structure, an arm drive input mechanism, a drive motion transmission mechanism, and a plurality of connectors. The stationary mounting structure positioned at the front of the bicycle attaches to the bicycle at one end of the mounting structure and provides two pivot locations at the other end of the mounting structure, one on each side of the structure. Attached at those pivot locations is the arm drive input mechanism for receiving the arm-power input, and which includes a pair of control arms with handgrips attached thereon. These control arms, which generally extend rearward and outward from their pivoted attach points on the mounting structure, allow the operator's arm power to assist in driving the bicycle through their fore-and-aft movement. The rear ends of the control arms connect to the drive motion transmission mechanism that operates in tandem with the control arms and which includes a pair of connecting rod assemblies positionable along opposite sides of the main frame of the bicycle and extending to a pair of bicycle pedals. The connectors mechanically and articulately link the connecting rod assemblies of the drive motion transmission mechanism to the bicycle pedals and to the rear ends of arm drive input mechanism control arms, thus allowing the fore-and-aft movement of the control arms to transmit through the connecting rod assemblies to the pedals. The apparatus of the present invention thereby enables the arm power of the operator to assist with pedaling drive operation of the bicycle.

More particularly, the plurality of connectors include two front connectors and two rear connectors each of which having a transverse biaxial configuration such that each connector defines a pair of axes extending transverse to one another. For linking the rear ends of the control arms to the front ends of the connecting rod assemblies, a first of the axes of each front connector defines a front first pivot plane perpendicular to this first axis allowing steering-type angular displacement of the attached control arm therethrough and a second of the axes of each front connector defines a front second pivot plane perpendicular to this second axis allowing reciprocating angular displacement of one control arm and one connecting rod assembly with respect to each other therethrough. For linking the rear ends of the connecting rod assemblies to the pedals, a first of the axes of each rear connector is coaxial with the rear end of one connecting rod assembly allowing coaxial rotation of the connecting rod assembly with respect to the rear connector about this first axis and a second of the axes of each rear connector lies substantially coaxial with one pedal shaft allowing pivoting movement of the connecting rod assembly about this axis. The front connector axes work in conjunction with the first axis of a corresponding rear connector to allow the connecting rod assembly to rotate during steering operation or during concurrent steering and arm drive operation. This rotation allows a bend in the connecting rod assembly to provide clearance between the present invention and the bicycle handlebars and main frame during the same operation.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
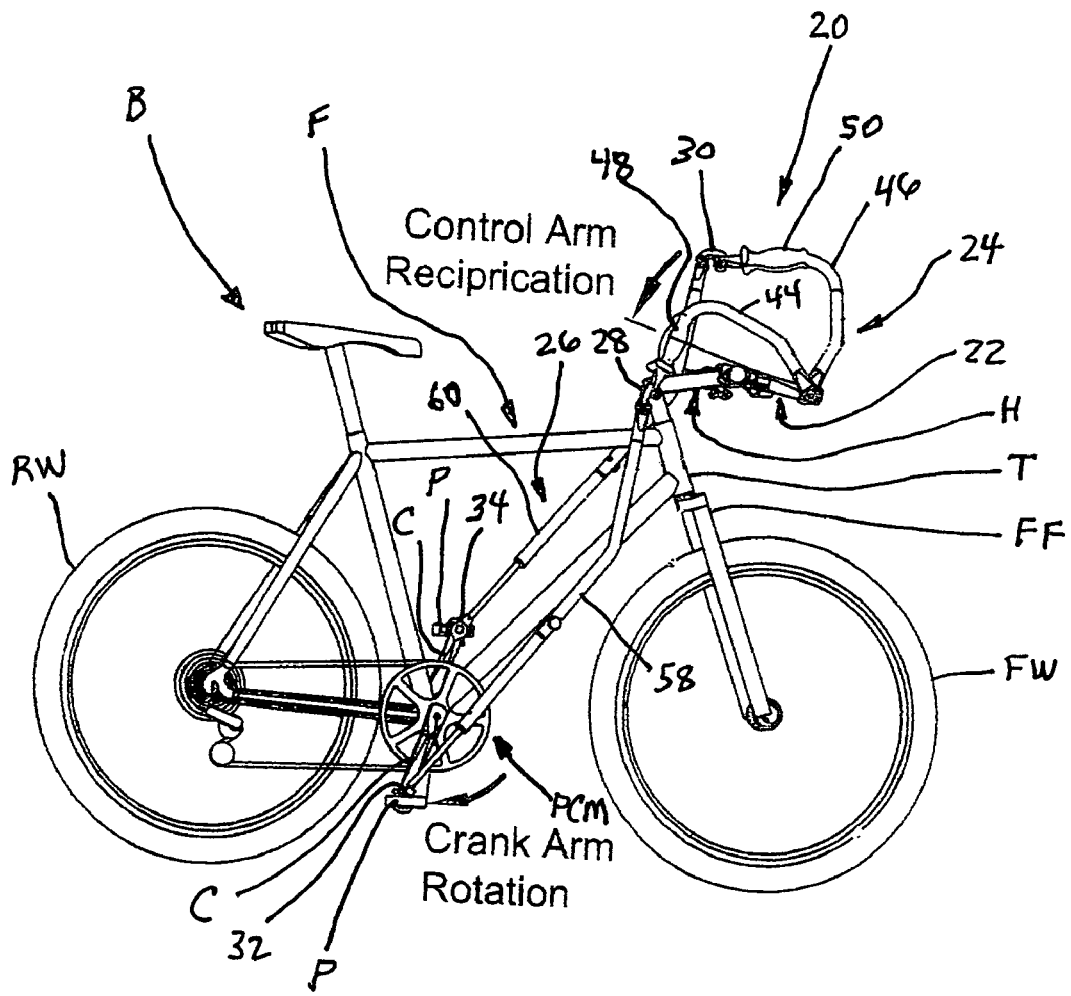
FIGS. 1-3 are side views of a conventional bicycle having an arm-drive apparatus of the present invention attached to it and showing operation of the apparatus through approximately one third of a crank rotation.

Referring to the drawings, and particularly to FIGS. 1-3, 4A and 4B, there is illustrated an exemplary embodiment of the arm-drive apparatus of the present invention, generally designated 20, for use by the operator of a conventional bicycle B or similar pedal driven machine. The bicycle B has a fore-and-aft main frame F, a head tube T fixedly connected on the forward end of the main frame F, a handlebar assembly H pivotally slotted into the head tube T, a front fork FF fixedly connected to the bottom end of the handlebar assembly H below the head tube T, a front wheel FW rotatably mounted to the front fork FF, a pair of pedal crank arms C rotatably mounted to the frame F at an intermediate bottom location thereon, pedals P rotatably mounted to shafts S attached to the ends of the pedal crank arms C. The pedal crank arms C rotatably drive the pedal crank mechanism PCM which in turn drives a rear wheel RW of the bicycle B and thereby propels the bicycle B.

Figure 2:
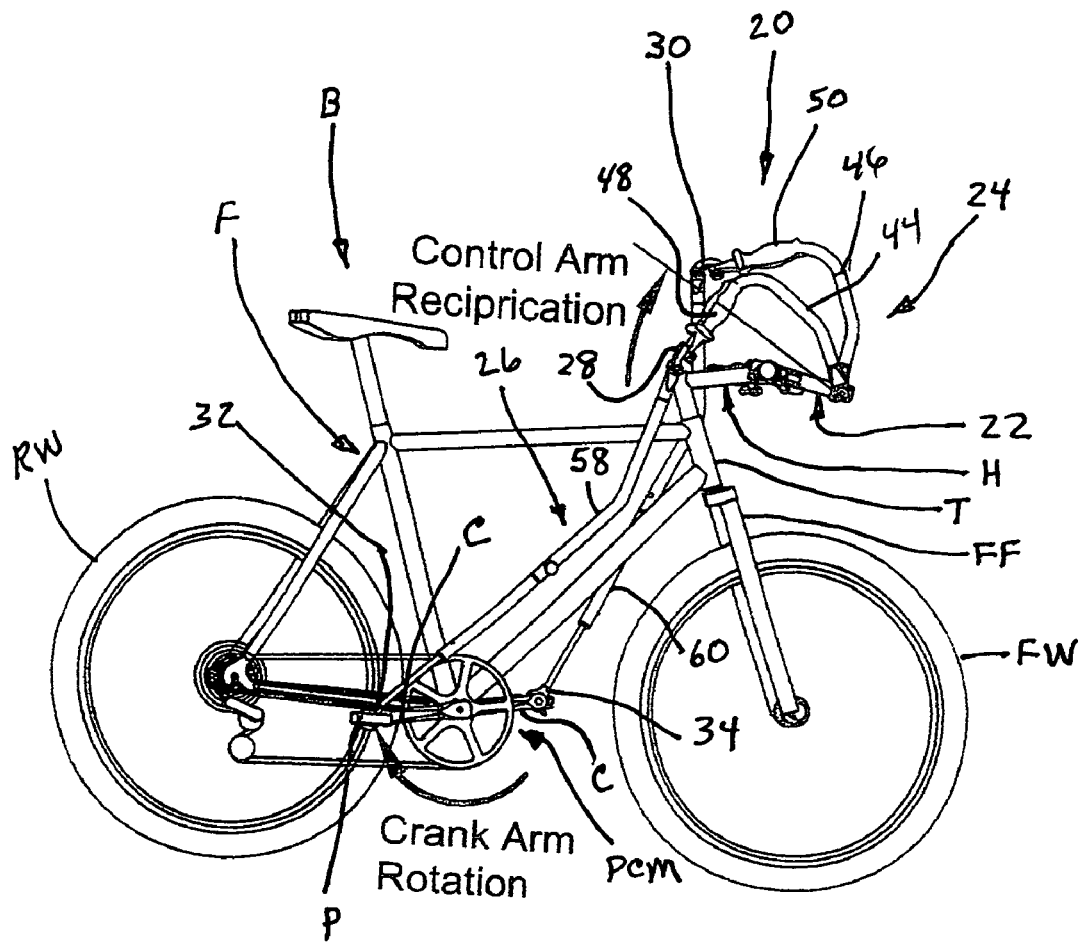
Figure 3:
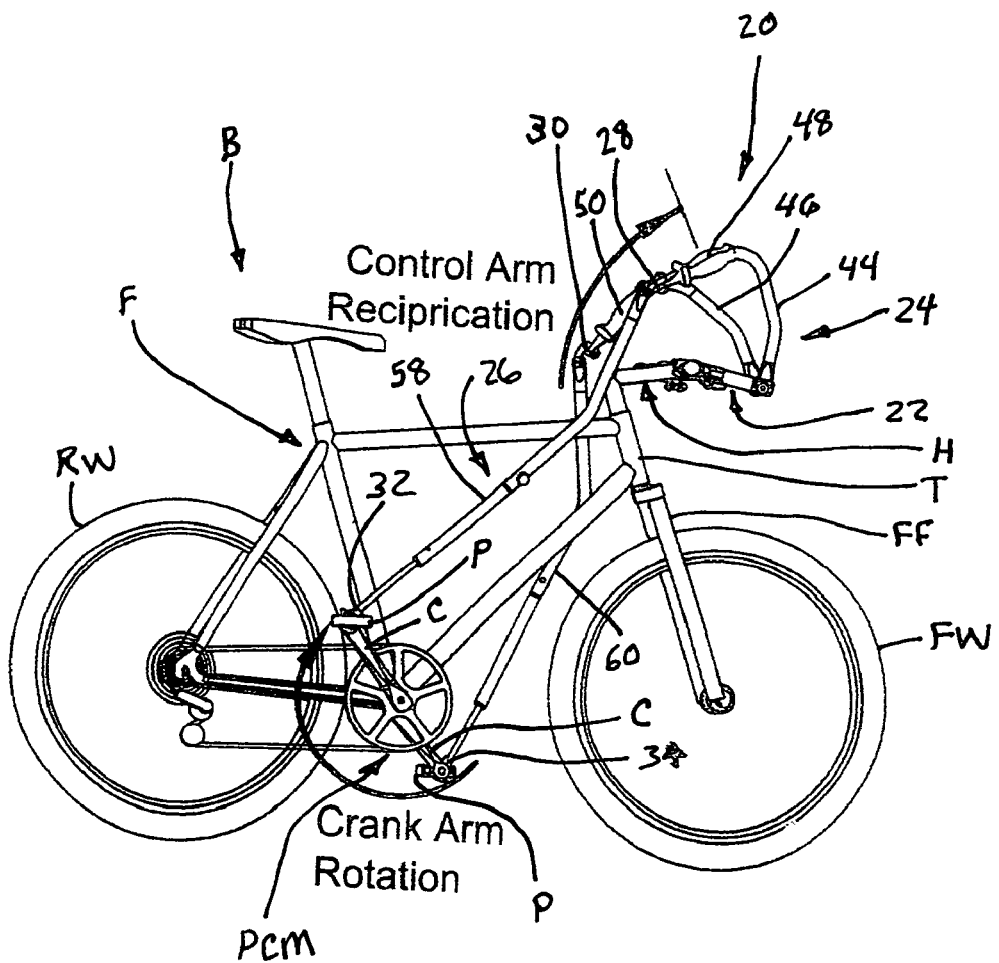

The arm drive apparatus 20 basically includes a stationary mounting structure 22, an arm drive input mechanism 24, a drive motion transmission mechanism 26, and a plurality of front and rear connectors 28, 30 and 32, 34. The stationary mounting structure 22 of the apparatus 20 is removably attached in a stationary, substantially centered, position on a front portion of the bicycle B. The apparatus 20 allows the operator's arm power to drive the arm drive input mechanism 24 fore-and-aft, as shown in FIGS. 1-3, which in turn moves the drive motion transmission mechanism 26 fore-and-aft also. The drive motion transmission mechanism 26 is removably attached to the arm drive input mechanism 24 and the pedals P and transmits the fore-and-aft motion of the arm drive input mechanism 24 to the pedal crank arms C to assist or drive the crank rotation of the pedal crank arms C, also seen in FIGS. 1-3. The front and rear connectors 28, 30 and 32, 34, as best seen in FIGS. 4A, 4B, 5 and 6, mechanically and articulately link the aforementioned components of the arm drive apparatus 20 and bicycle B together. More particularly, the front connectors 28, 30 are disposed between and link the arm drive input mechanism 24 and the drive motion transmission mechanism 26, and the rear connectors 32, 34 are disposed between and link the drive motion transmission mechanism 26 and the pedals P.

Figure 12:
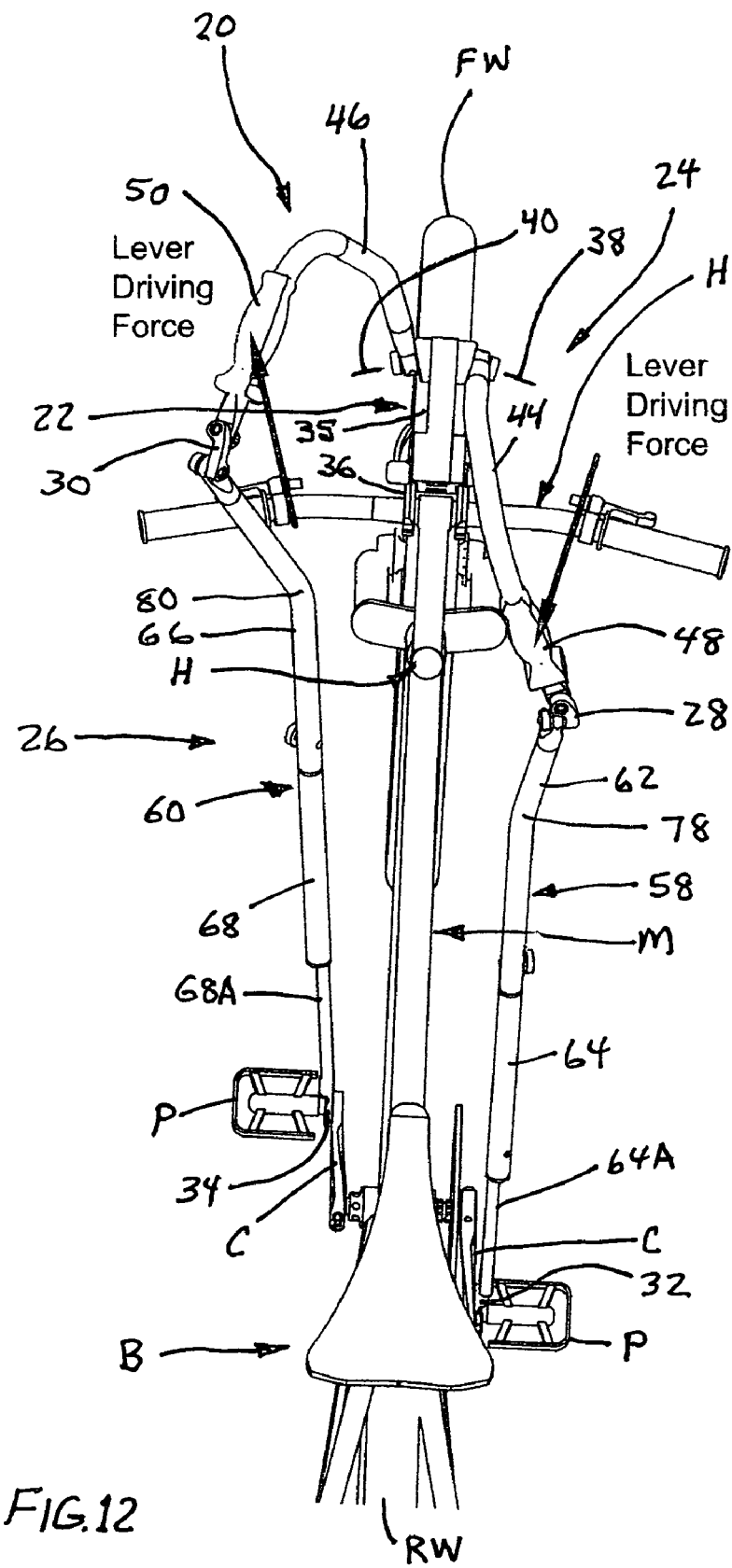

Referring now to FIGS. 4A, 4B, 5 and 6, the stationary mounting structure 22 of the apparatus 20 includes a rigid bracket 35, with a first end 35A and a second end 35B, a quick release handlebar clamp mechanism 36 having first and second matable components 36A, 36B respectively fixedly attached at the rigid bracket first end 35A and at the center of the handlebar assembly H and extending slightly forward and downward therefrom. The rigid bracket second end 35B defines a pair of axes 38, 40, each on an opposite side thereof. The axes 38, 40 extend outward laterally and slightly rearward, also as shown in FIG. 12, creating a slightly off parallel relationship to one another. Because of the C-clamp shape and quick release nature of the second component 36B of the handlebar quick release mechanism 36, the exact angle of the rigid bracket 30 with respect to the horizontal may be rotatably adjusted quickly and as needed for ideal positioning of the arm drive apparatus 20 during installation. While in the exemplary embodiment the stationary mounting structure 22 is mated to the cross-member of the handlebar assembly H on the conventional bicycle B, it is also contemplated that the structure 22 may be made to attach elsewhere on the handlebar assembly H such as the stem portion thereof or replace the handlebar assembly H altogether and connect directly to the front fork FF through the head tube. Moreover, especially for a stationary exercise bicycle or a bicycle retrofitted to be stationary, it is also contemplated that the stationary mounting structure may attach directly to the main frame F instead of to the steerable portions of the bicycle.

Referring again to FIGS. 4A, 4B, 5 and 6, the arm drive input mechanism 24 principally includes a pair of control arms 44, 46 for receiving arm power input from the operator. Each control arm 44, 46 has a front end 44A, 46A and rear end 44B, 46B, and generally extends rearward of the front portion of the bicycle B and outwardly of the centered position of the stationary mounting structure 22. More particularly, the control arms 44, 46 are pivotally mounted at their respective front ends 44A, 46A to the axes 38, 40 of the stationary mounting structure 22 and extend up and over the handlebar assembly H thereby allowing the control arms 44, 46 to pivotally move relative to the axes 38, 40 and reciprocate fore-and-aft, as indicated in FIGS. 1 and 2, as they are pushed and pulled by the bicycle operator. A pair of handgrips 48, 50 are respectively provided on the control arms 44, 46 nearer to their rear ends 44B, 46B than to their front ends 44A, 46A so that the bicycle operator may ergonomically grip the control arms 44, 46 while moving them fore-and-aft to input arm power into the apparatus 20. As also seen in FIGS. 5 and 6 and further in FIG. 6A, auxiliary brake lever assemblies 52 (only one is shown) may be attached to the control arms 44, 46 near the handgrips 48, 50 and made to quickly attach to a conventional brake lever assembly 53 using auxiliary brake cable connectors 54 and auxiliary brake cables 56, thereby allowing the operator to apply the conventional bicycle braking mechanism (not shown) while using the apparatus 20.

Figure 11:
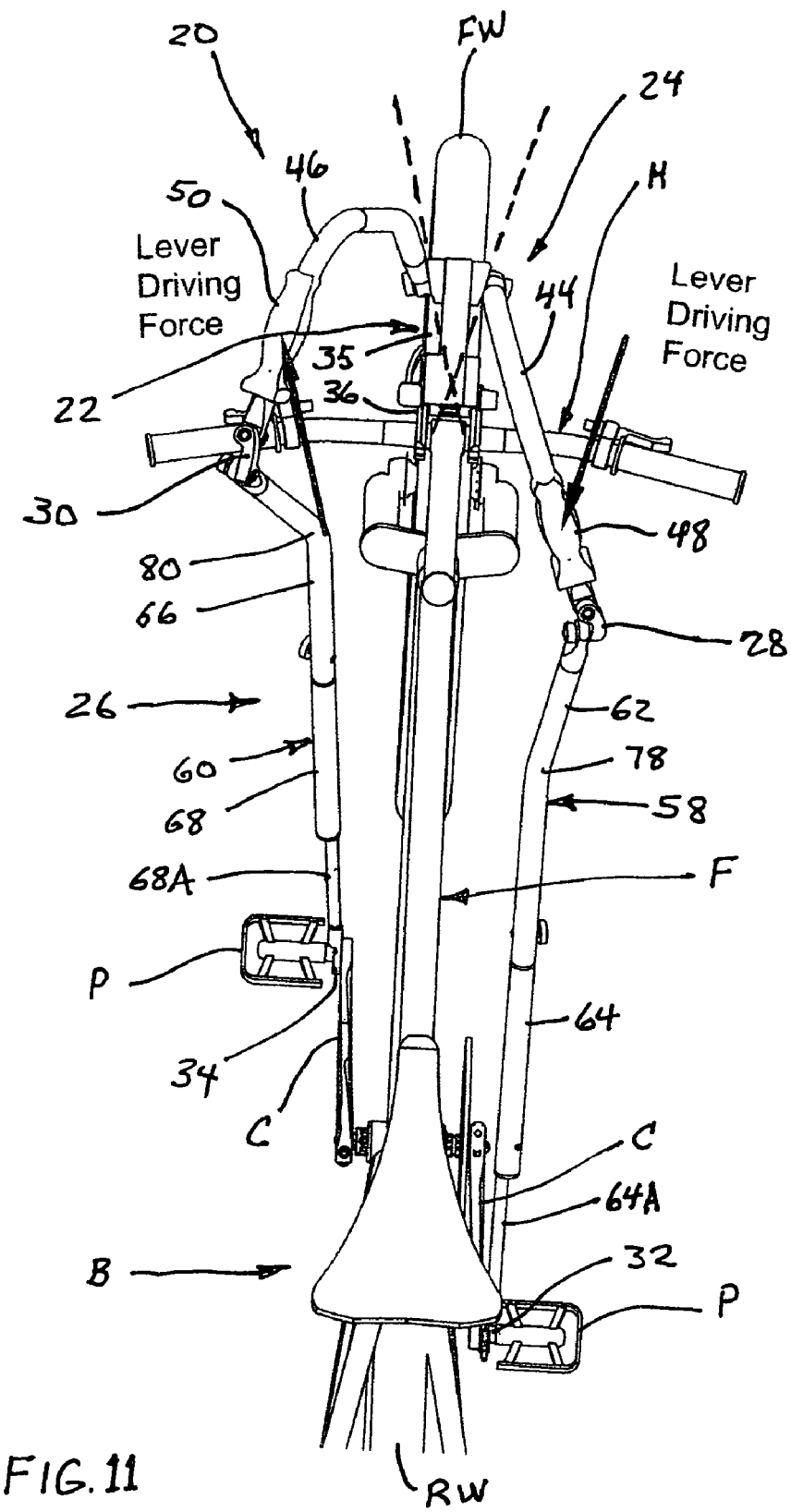
FIGS. 11-13 are top views of the apparatus illustrating the motion of a pair of control arms of the apparatus that minimizes steering torques.
Figure 13:
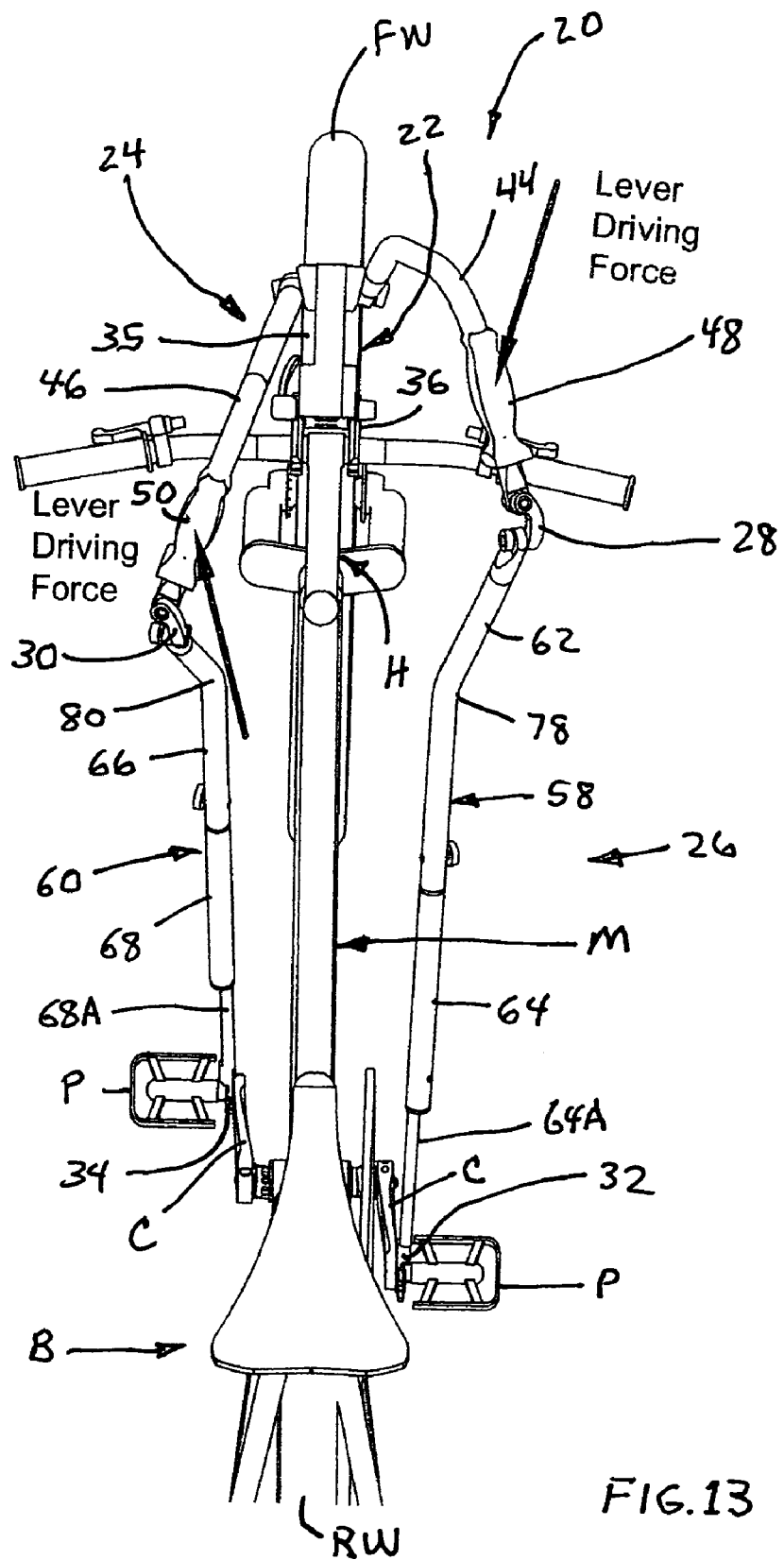
Figure 14:
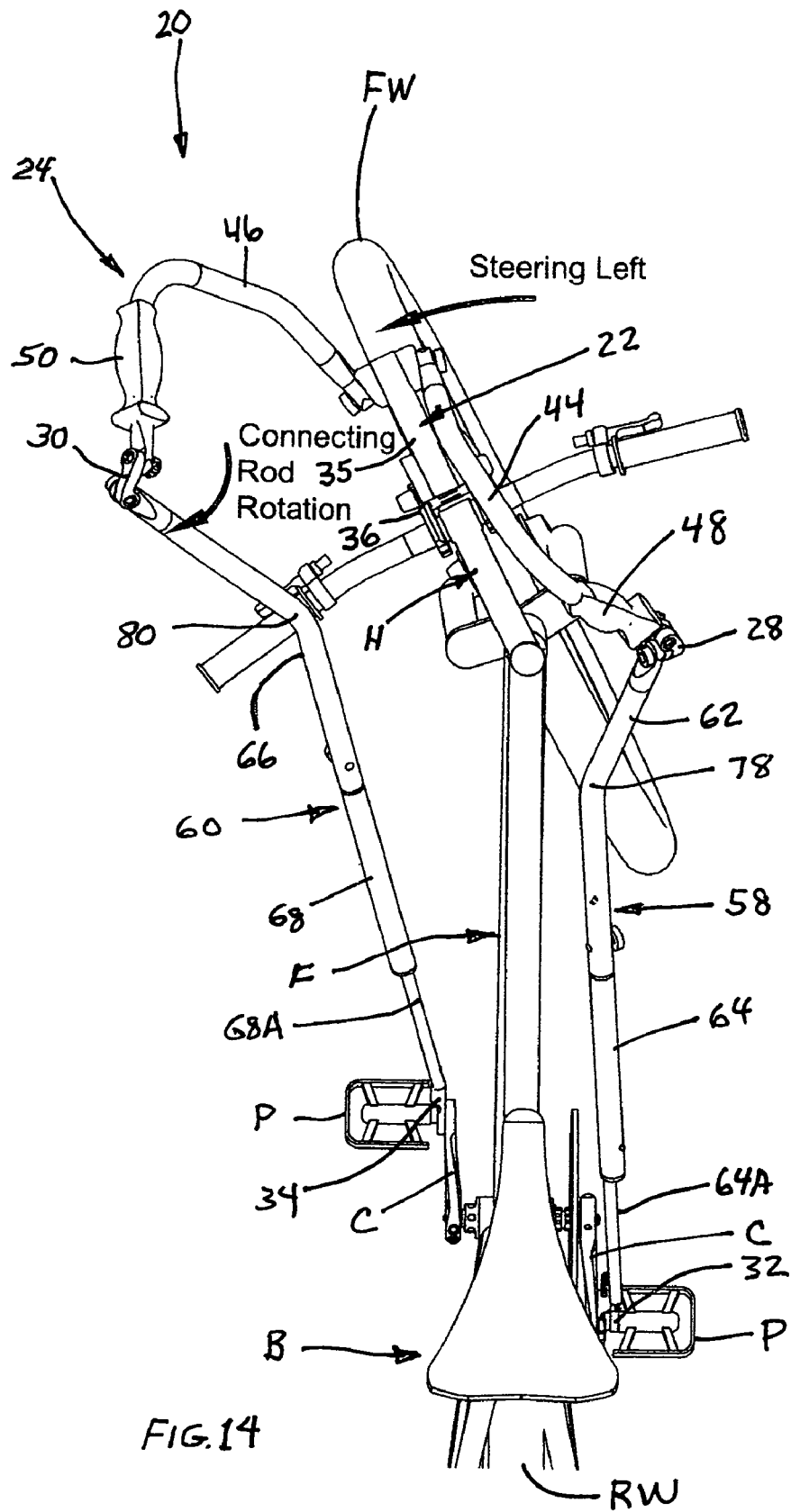
FIGS. 14 and 15 are top views of the apparatus illustrating the rotation of a pair of connecting rod assemblies of the apparatus during steering operation on the bicycle.
Figure 15:
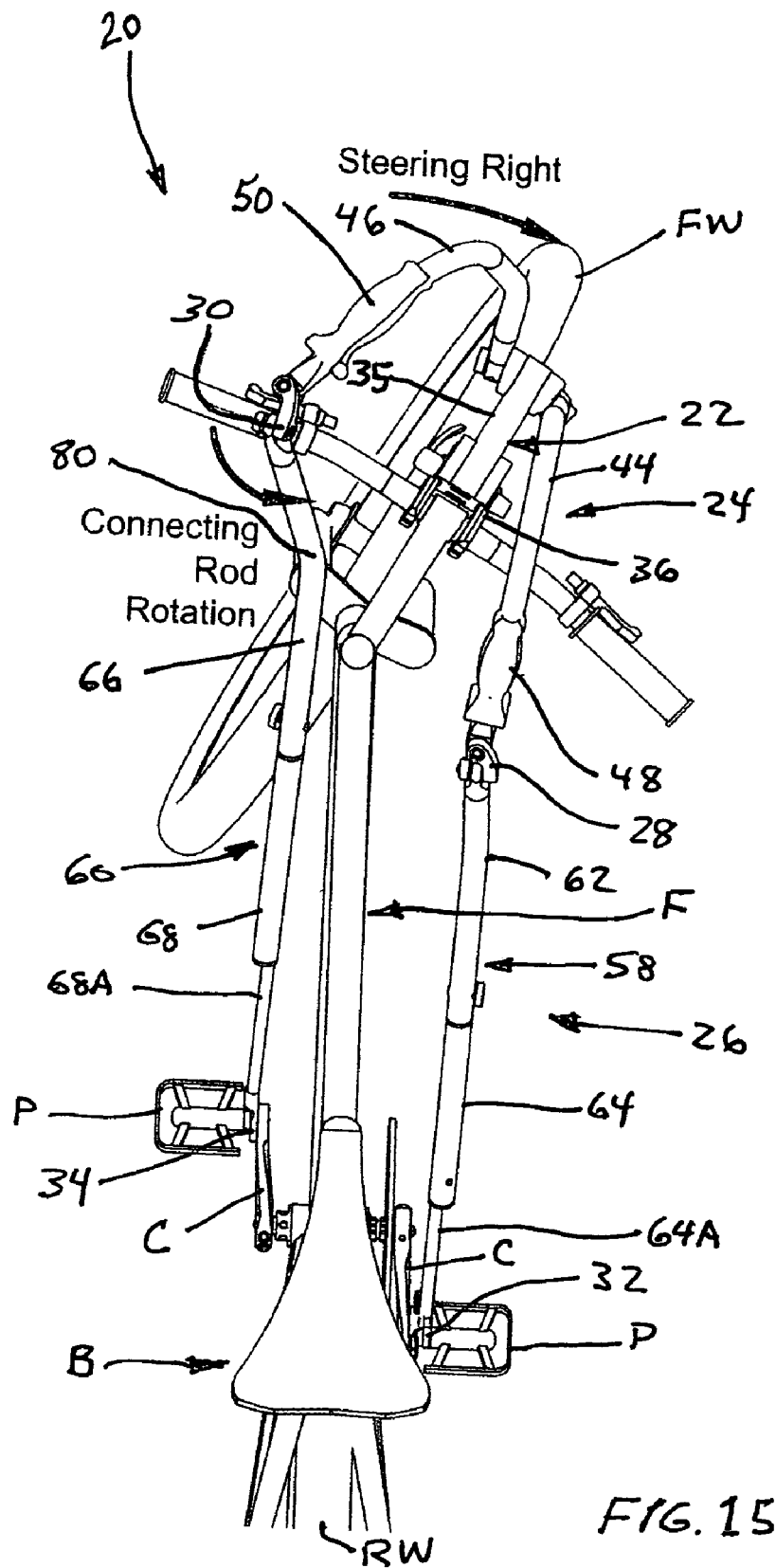

Because of their slightly off parallel relationship on the second end 35B of the rigid bracket 35 of the stationary mounting structure 22, the pair of axes 38, 40 onto which the control arms 44, 46 are pivotally mounted cause the control arms 44, 46 to reciprocally sweep in vertical planes that are not parallel to each other, as shown in FIGS. 11-13. The intersection of these planes forms a line approaching parallel and in proximity to a central axis of the head tube T into which the handlebar assembly H and bicycle front fork FF are slotted. This results in radial forces applied by the operator to the central axis of the head tube T during operation of the apparatus 20 so as to minimize torques, which might otherwise cause unintended steering of the bicycle B via the handlebar assembly H, and thereby enhance bicycle control. The resulting outward sweep when one of the control arms 44, 46 is at its top or forward position and inward sweep when the same one of the control arms 44, 46 is at its bottom or rearward position also results in an ergonomic motion of the arms by the rider further enhancing the application of the apparatus 20 for its intended purpose.

Figure 4A:
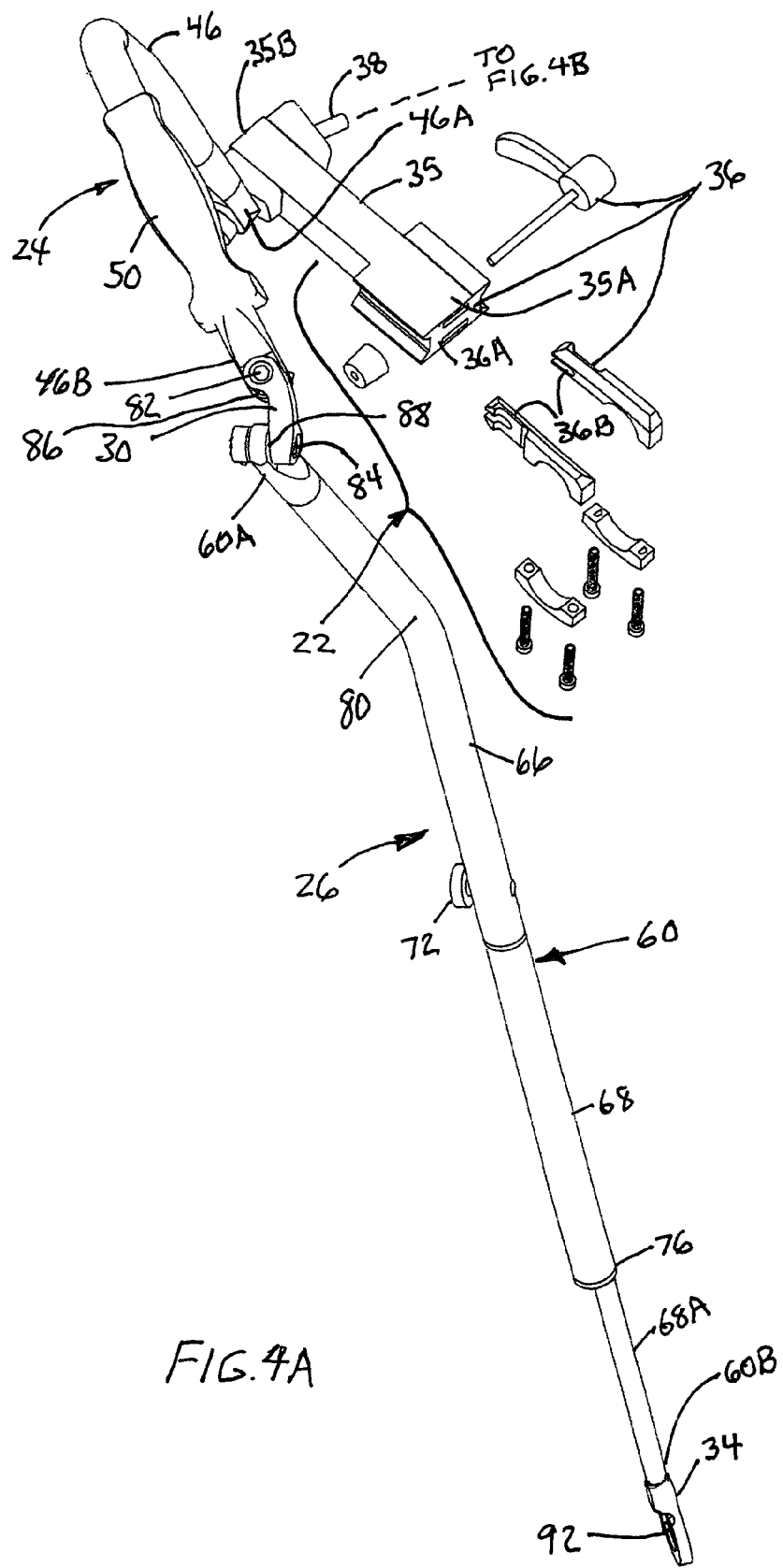
FIGS. 4A and 4B together are an enlarged exploded view of the apparatus.
Figure 4B:
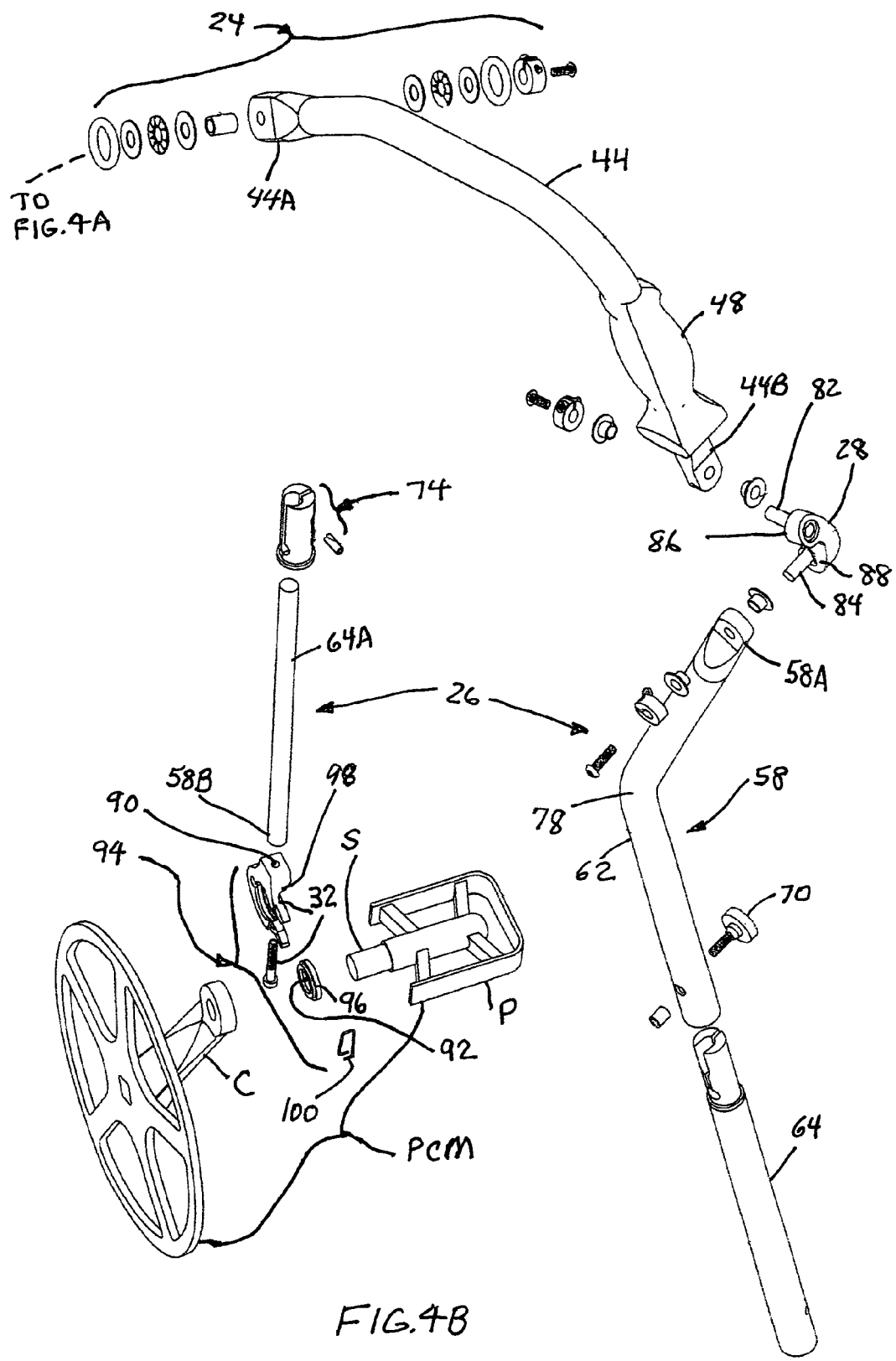
Figure 5:
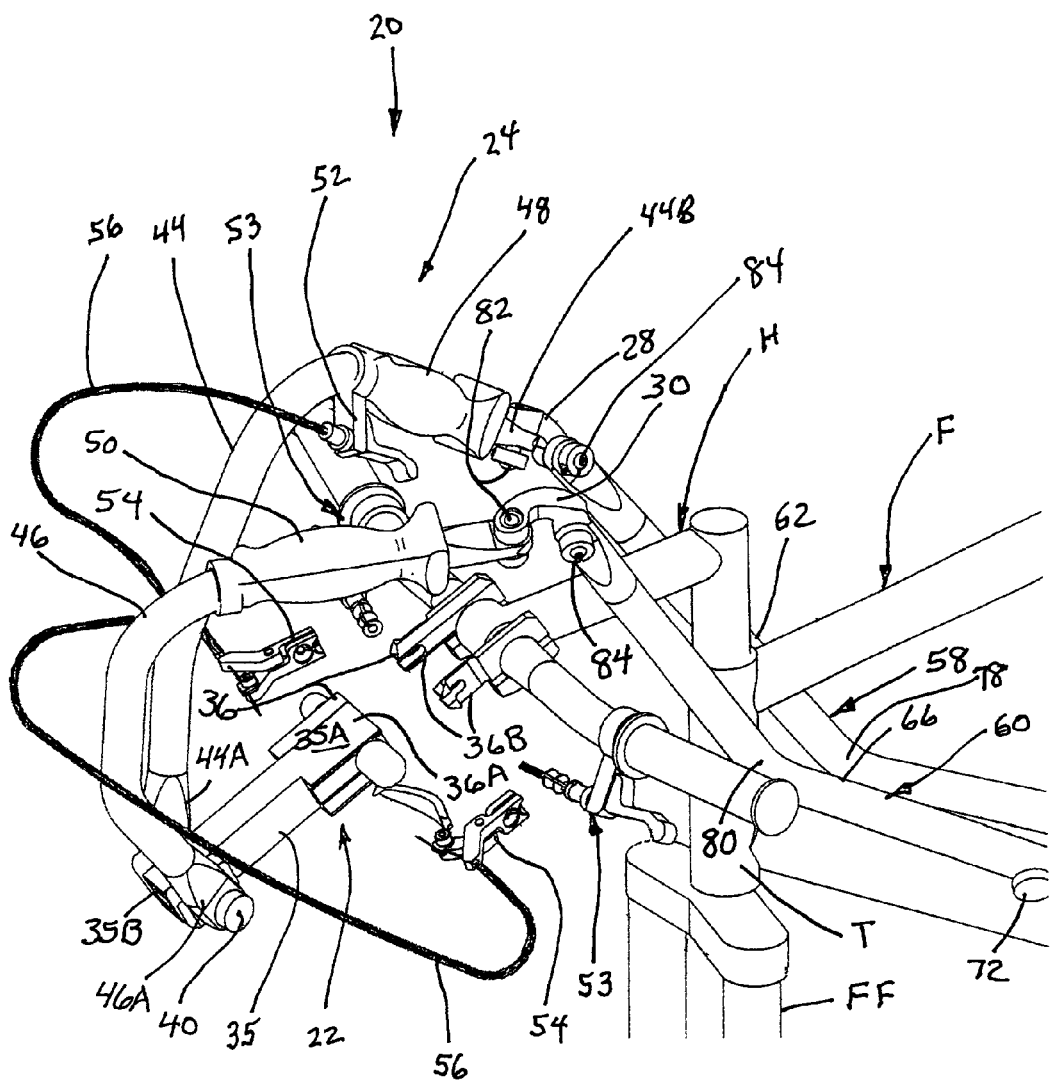
FIGS. 5 and 6 are front perspective views of the apparatus showing a stationary mounting structure of the apparatus quickly and easily attaching to conventional handlebars of the bicycle.
Figure 6:
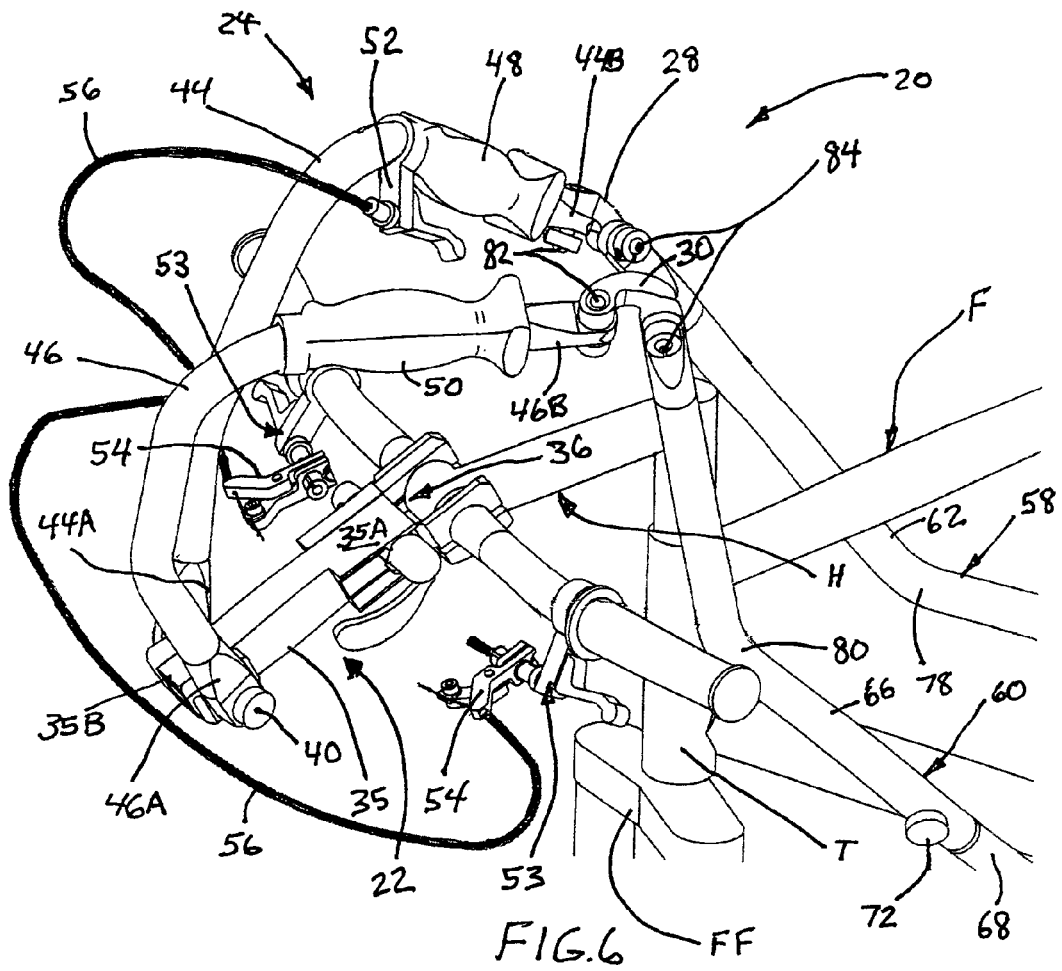
Figure 6A:
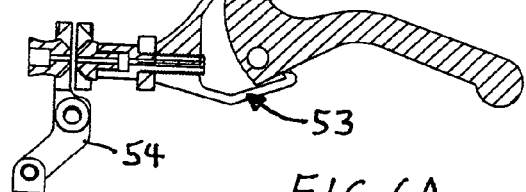
FIG. 6A is an enlarged longitudinal sectional view of one of the auxiliary brake cable connectors coupled to a conventional brake lever assembly as seen in FIG. 6.
Figure 7:
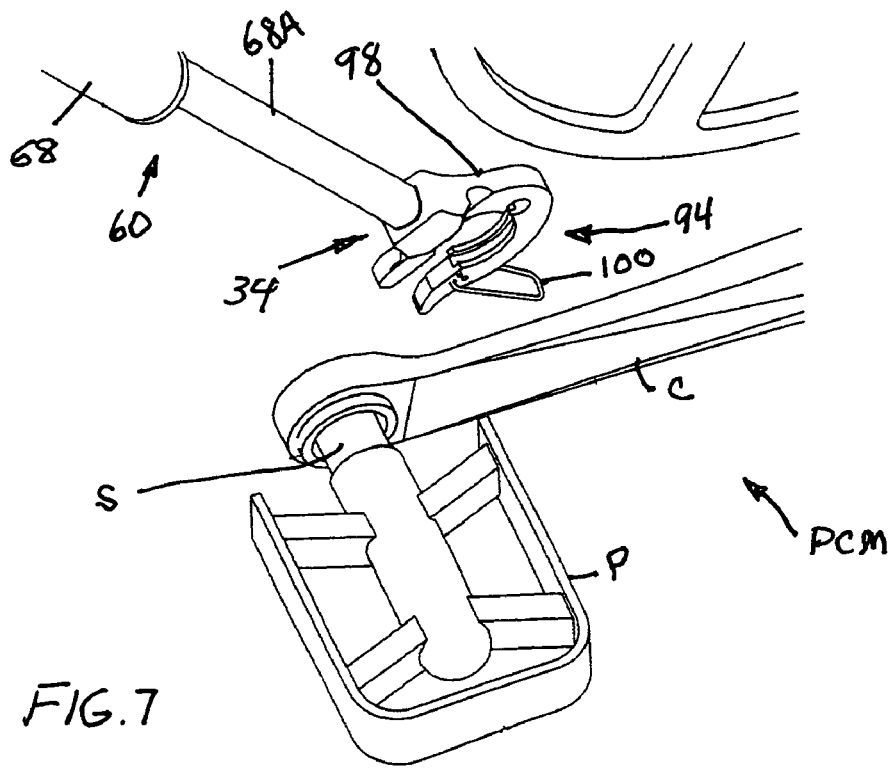
FIGS. 7 and 8 are side perspective views of the apparatus showing a rear connector of the apparatus as a compliant hinge quickly and easily attaching to a bearing ring on a conventional pedal shaft of the bicycle.
Figure 8:
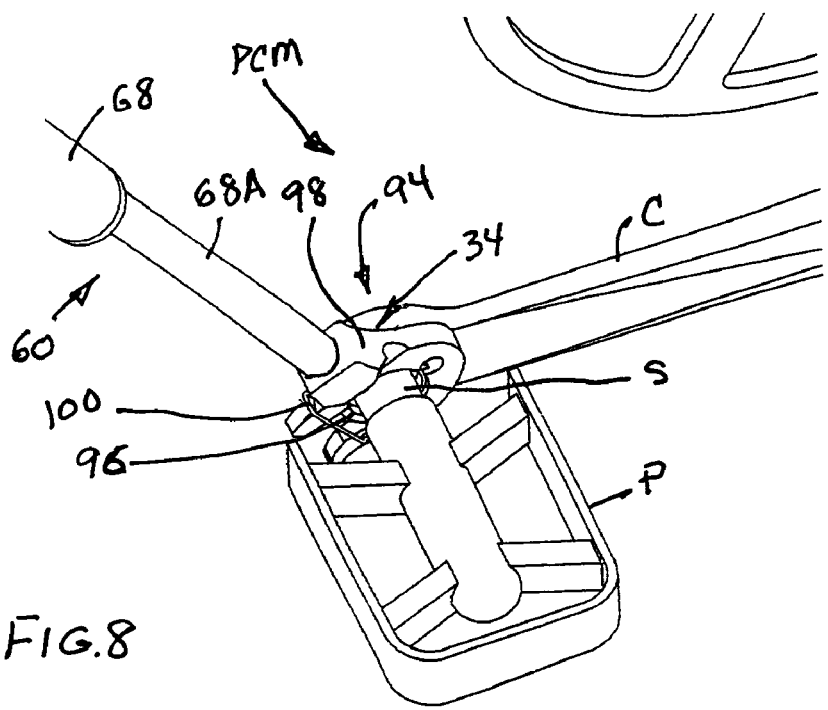
Figure 9:
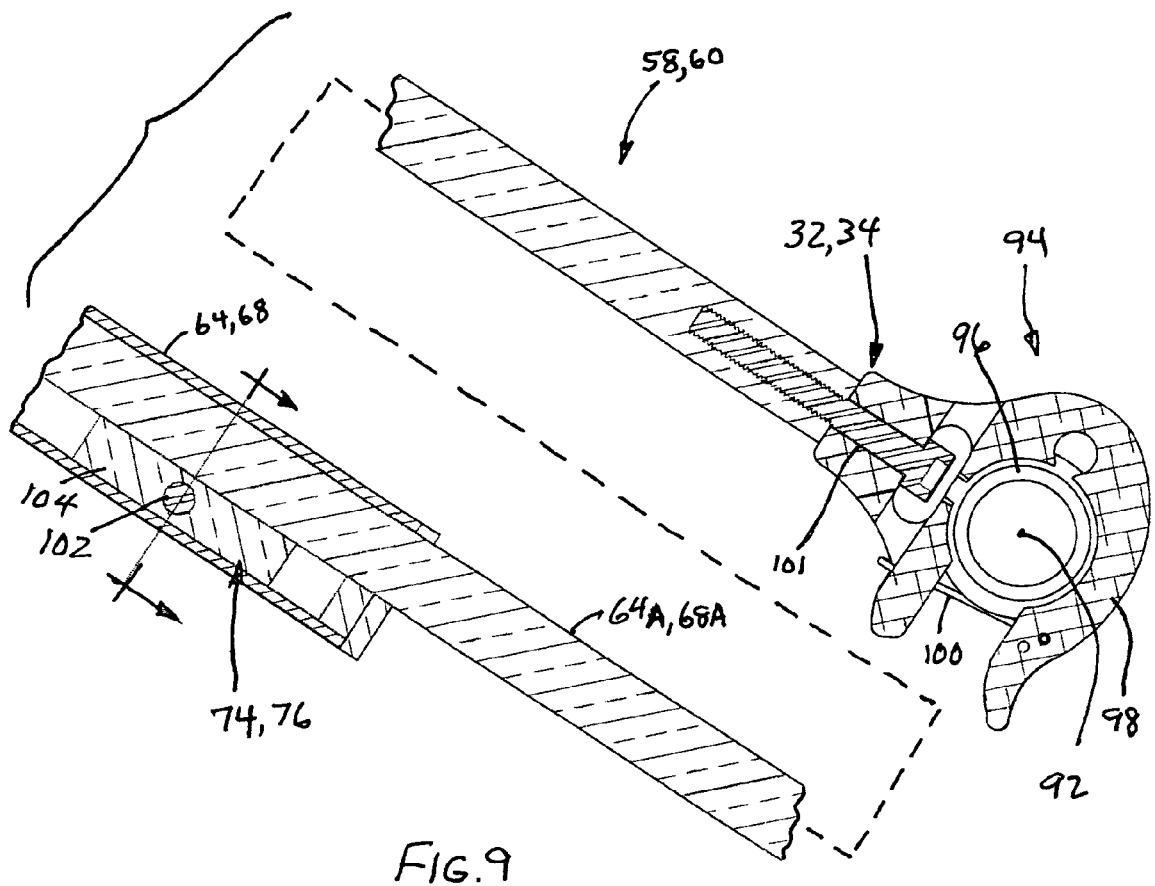
FIG. 9 is an enlarged assembled longitudinal sectional view of a rearward portion of one connecting rod assembly and one rear connector in the form of a pedal clamp mechanism mounted thereto.
Figure 10:
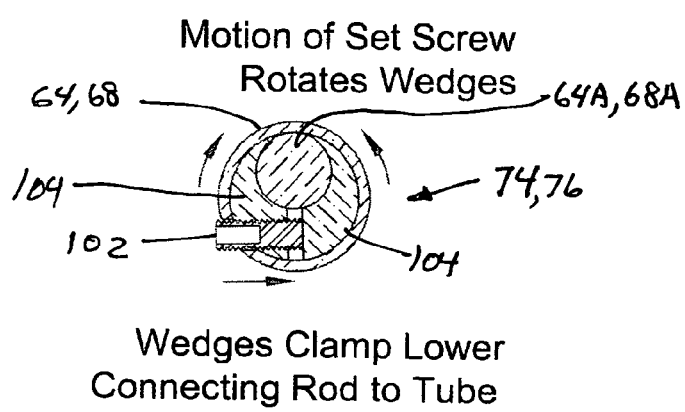
FIG. 10 is a cross-sectional view of an adjustment clamp mechanism taken along lines 10-10 of FIG. 9.

Referring now to FIGS. 1-3, 4A, 4B, and 5-9, the arm drive input mechanism 24 pivotally connects to the drive motion transmission mechanism 26 of the apparatus 20 using the front connectors 28, 30, to be discussed in greater detail below. The drive motion transmission mechanism 26 includes a pair of generally rigid connecting rod assemblies 58, 60 positionable along opposite sides of the bicycle main frame F and extending between the control arms 44, 46 and the bicycle pedals P. The connecting rod assemblies 58, 60 pivotally connect to the pedals P using the rear connectors 32, 34, also to be discussed in greater detail below, and transmit the fore-and-aft movement of the control arms 50 down to the pedals P that are attached to the pedal crank arms C. As shown in FIGS. 4A and 4B, the connecting rod assemblies 58, 60 respectively include forward and rearward rods 62, 64 and 66, 68 detachably attached to each other with respective clamp knobs 70, 72, or a similar quick-release fastening method. The respective rearward rods 64, 68 also include telescoping rear end portions 64A, 68A detachably attached thereto with adjustment clamp mechanisms 74, 76, as seen in FIGS. 9 and 10, thereby allowing the length of the connecting rod assemblies 58, 60 to be adjusted as required. The respective forward rods 62, 66 also include clearance bends 78, 80 to be discussed in greater detail below.

In order to mechanically and articulately link the apparatus 20 together as shown in FIGS. 4A, 4B, and 5-9, the two front connectors 28, 30 respectively biaxially pivotally connect the rear ends 44B, 46B of the control arms 44, 46 to the front ends 58A, 60A of the connecting rod assemblies 58, 60, and the two rear connectors 32, 34 respectively biaxially pivotally connect the rear ends 58B, 60B of the connecting rod assemblies 58, 60 to the pedals P. For each control arm 44, 46 to connecting rod assembly 58, 60 connection, each of the two front connectors 28, 30 defines a pair of axes, a front first axis 82 and a front second axis 84, extending transverse to one another and biaxially connecting one connecting rod assembly front end 58A, 60A to one control arm rear end 44B, 46B. Each front connector front first axis 82 defines a front first pivot plane 86 substantially perpendicular thereto and enables angular displacement of one control arm 44, 46 through the front first pivot plane 86 with respect to the one connecting rod assembly 58, 60 to which it is joined, primarily during steering. Each front connector front second axis 84 defines a front second pivot plane 88 substantially perpendicular thereto and enables reciprocating angular displacements of one control arm 44, 46 and one connecting rod assembly 58, 60 with respect to each other. For each connecting rod assembly 58, 60 to pedal P connection, each of the two rear connectors 32, 34 defines a pair of axes, a rear first axis 90 and a rear second axis 92, extending transverse to one another and biaxially connecting one connecting rod assembly rear end 58B, 60B to one foot pedal P. Each rear connector rear first axis 90 is coaxial with one connecting rod assembly rear end 58B, 60B allowing coaxial rotation of the one connecting rod assembly 58, 60 thereabout. Each rear connector rear second axis 92 is substantially coaxial with an axis of the pedal shaft S allowing pivotal movement of one connected connecting rod assembly 58, 60 relative to the rear second axis 92.

For a conventional bicycle, each rear connector 32, 34 attaches to the axis of the pedal shaft S using a pedal clamp mechanism 94 that includes a circular bearing 96, a compliant hinge 98, and a wire latch 100, as shown in FIGS. 4A, 4B, and 7-9. First, the circular bearing 96 is installed between the pedal crank arm C and the bicycle pedal P. The compliant hinge 98 is rotatably connected to the rear end 58B, 60B of the connecting rod assembly 58, 60 by a bolt 101 and is then easily placed around the circular bearing 96 during installation and latched close with the wire latch 100. The circular bearing 96 may be made of a plastic material capable of fatigue and failure in response to shear forces generated by excessive wear thereof. The compliancy in the compliant hinge 98 also allows a small amount of angular displacement of the rear connector first axis 90 with respect to the axis of the pedal shaft S during normal operation of the apparatus 20 for minimizing interference with the free rotation of the pedal P.

Referring to FIGS. 11-15, the clearance bends 78, 80 in the forward rods 62, 66 of the connecting rod assemblies 58, 60 can be seen to rotate during conventional bicycle steering operation or concurrent steering as well as during operation of the arm drive apparatus 20. The rotation of each bend 78, 80 allows clearance between the arm drive apparatus 20 and the main frame F and handlebar assembly H of the bicycle B. The rotation of each connecting rod assembly 58, 60 is allowed by the simultaneous apparatus component pivoting about the front connector pair of axes 82, 84 and the rear connector first axis 90.

To recap, several of the advantages of the present invention are demonstrated by how it efficiently attaches and adjusts to a conventional bicycle B. First, and for attachment on conventional bicycles where removal of the handlebars is to be avoided, the stationary mounting structure 22 includes the quick-release clamp mechanism 36 for quick and easy fitting on conventional handlebars H having a transverse type tube member. Second, the rear end of the apparatus 20 connects easily with each conventional pedal P by the placement of the circular bearing 96 on the pedal shaft S between the pedal P and pedal crank C around which the compliant hinge 98 is easily attached with the wire latch 100. And, in order to be adaptable to a variety of frame sizes, the connecting rod assemblies 58, 60 are comprised of respective pairs of forward and rearward rods 62, 64 and 66, 68 removably clamped together coaxially with each of the rearward rods 64, 68 having the telescoping end portion 64A, 68A adjustably set by manipulating a set screw 102 against wedges 104 of the clamp mechanism 74, 76 so that the lengths of the connecting rod assemblies 58, 60 may be adjusted quickly and easily to meet the requirements of the bicycle B to which the apparatus 20 is attached.

The present invention is also designed to overcome the inherent instabilities of prior designs. The pivot axes 38, 40 on the one end of the stationary mounting structure 22 are each canted slightly rearward from a horizontal and transverse position such that the control arms 44, 46 attached about the axes 38, 40 sweep in planes that minimize torques applied to the handlebars H thereby allowing the operator to maintain effective control over the bicycle B during operation of the arm drive input apparatus 20.

It is thought that the present invention and its attendant advantages will be understood from the foregoing description and it will be apparent that various changes may be made thereto without departing from the spirit and scope of the invention or sacrificing all of its material advantages, the form hereinbefore being merely an exemplary embodiment thereof.

What is claimed is:

1. An arm drive apparatus for a bicycle, comprising:
    a stationary mounting structure attachable in a stationary, substantially centered, position on a front portion of the bicycle;
    an arm drive input mechanism for receiving arm power input from an operator of the bicycle, said input mechanism including a pair of control arms having respective front ends pivotally mounted to said stationary mounting structure to enable fore-and-aft movement of said control arms, said control arms also generally extending rearwardly of the bicycle front portion and outwardly of the centered position of said stationary mounting structure, each of said control arms for gripping by the operator in order to input arm power to drive the control arms through said fore-and-aft movement;
    a drive motion transmission mechanism including a pair of connecting rod assemblies positionable along opposite sides of a main fore-and-aft frame of the bicycle and extending generally between a pair of pedals of the bicycle and said control arms of said arm drive input mechanism;
    a pair of front connectors each defining a pair of axes extending transverse to one another and biaxially connecting a front end of one of said connecting rod assemblies with a rear end of one of said control arms; and
    a pair of rear connectors each defining a pair of axes extending transverse to one another and biaxially connecting a rear end of one of said connecting rod assemblies with one of the pedals of the bicycle, said front and rear connectors thereby mechanically and articulately linking said connecting rod assemblies to the pedals of the bicycle and said rear ends of said control arms so as to transmit said fore-and-aft movement of said control arms via the connecting rod assemblies to the pedals to enable the arm power input of the operator to assist with pedaling drive operation of the bicycle;
    wherein each of said front connectors defines a front first pivot plane substantially perpendicular to a front first axis of said transverse axes that allows angular displacement of one control arm through said front first pivot plane; and
    wherein each of said front connectors also defines a front second pivot plane substantially perpendicular to a front second axis of said transverse axes that allows reciprocating angular displacements of said control arm and said connecting rod assembly with respect to each other through said front second pivot plane.

2. The arm drive apparatus of claim 1 wherein each of said rear connectors defines a rear first axis of said transverse axes coaxial with the rear end of one connecting rod assembly that allows coaxial rotation of said connecting rod assembly around said rear first axis.

3. The arm drive apparatus of claim 2 wherein each of said rear connectors also defines a rear second axis of said transverse axes substantially coaxial with an axis of a pedal shaft that allows pivotal movement of said connecting rod assembly relative to said rear second axis.

4. The arm drive apparatus of claim 3 wherein each said connecting rod assembly includes a clearance bend nearer the front end such that the front connector axes and rear connector first axis allow the connecting rod assembly and clearance bend to rotate thereby providing clearance to handlebars and the frame of the bicycle during bicycle steering operation and during concurrent steering and arm drive operations.

5. The arm drive apparatus of claim 3 further comprising a pair of circular bearings each attached to the pedal shaft between a pedal crank arm and the pedal and around which one of said rear connectors is compliantly and removably attached, said compliancy allowing a small amount of angular displacement of the rear connector rear first axis with respect to said pedal shaft.

6. The arm drive apparatus of claim 5 wherein each circular bearing is made of a plastic material capable of fatigue and failure in response to shear forces generated by excessive wear thereof.

7. The arm drive apparatus of claim 1 wherein said connecting rod assemblies each include a forward rod and a rearward rod detachably attached to the forward rod and having a telescoping rear end portion adapted to adjust the length of each connecting rod assembly.

8. The arm drive apparatus of claim 7 wherein said forward rod has a shallow bend configuration for clearance during bicycle steering operation or concurrent arm drive and steering operation.

\* \* \* \* \*